United States Patent
Han et al.

(10) Patent No.: US 10,382,221 B2
(45) Date of Patent: Aug. 13, 2019

(54) COMMUNICATION METHOD BASED ON AUTOMOTIVE SAFETY INTEGRITY LEVEL IN VEHICLE NETWORK AND APPARATUS FOR THE SAME

(71) Applicants: HYUNDAI MOTOR COMPANY, Seoul (KR); KIA MOTORS CORPORATION, Seoul (KR)

(72) Inventors: Jeong Seok Han, Suwon-si (KR); Sang Woo Yu, Hwaseong-si (KR); Dong Ok Kim, Goyang-si (KR); Jin Hwa Yun, Seoul (KR)

(73) Assignees: HYUNDIA MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 15/702,370

(22) Filed: Sep. 12, 2017

(65) Prior Publication Data
US 2018/0076970 A1 Mar. 15, 2018

(30) Foreign Application Priority Data

Sep. 13, 2016 (KR) .......... 10-2016-0118340
Jul. 27, 2017 (KR) .......... 10-2017-0095218

(51) Int. Cl.
| | |
|---|---|
| *H04L 12/40* | (2006.01) |
| *H04L 12/44* | (2006.01) |
| *H04L 12/46* | (2006.01) |
| *H04L 29/06* | (2006.01) |
| *H04L 29/08* | (2006.01) |

(52) U.S. Cl.
CPC .............. *H04L 12/40* (2013.01); *H04L 12/46* (2013.01); *H04L 67/12* (2013.01); *H04L 67/125* (2013.01); *H04L 69/18* (2013.01); *H04L 69/26* (2013.01); *H04L 2012/40215* (2013.01); *H04L 2012/40273* (2013.01); *H04L 2012/445* (2013.01)

(58) Field of Classification Search
CPC ........... H04L 12/40; H04L 12/46–4633; H04L 2012/40208–40293; H04L 67/12–125; H04L 69/18–26; H04W 4/30–48; H04W 84/005; H04W 84/18–22
See application file for complete search history.

(56) References Cited

U.S. PATENT DOCUMENTS

| | | | |
|---|---|---|---|
| 2014/0023068 A1* | 1/2014 | Kim ........................ | H04L 45/72 370/355 |
| 2016/0373261 A1* | 12/2016 | Tschache ................ | G06F 13/36 713/176 |
| 2017/0150361 A1* | 5/2017 | Paryani .................. | H04W 12/08 370/329 |

* cited by examiner

*Primary Examiner* — Timothy J Weidner
(74) *Attorney, Agent, or Firm* — Morgan, Lewis & Bockius LLP

(57) ABSTRACT

An operation method of a first communication node supporting communications between an Ethernet-based network and a controller area network (CAN) includes: receiving an Ethernet message from a second communication node belonging to the Ethernet-based network; performing an integrity verification on first automotive safety integrity level (ASIL) authentication information included in the Ethernet message; generating a CAN message based on the Ethernet message for which the integrity verification has been completed; and transmitting the CAN message to a third communication node belonging to the CAN.

17 Claims, 12 Drawing Sheets

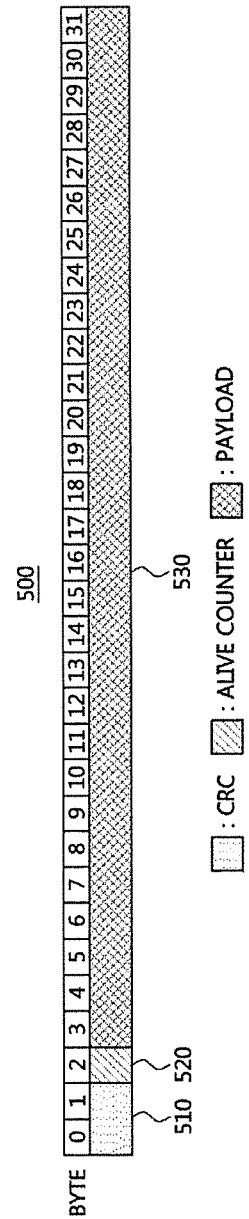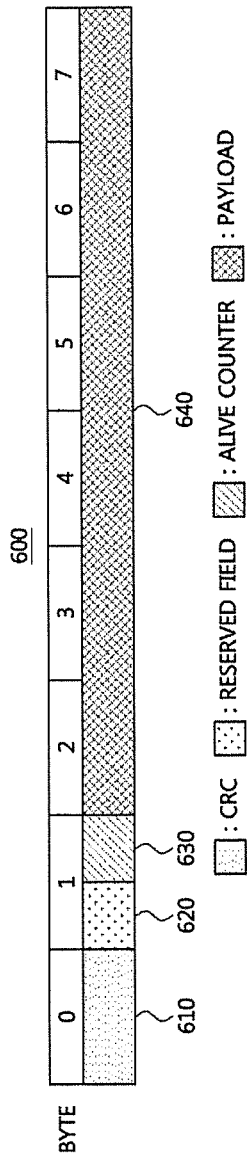

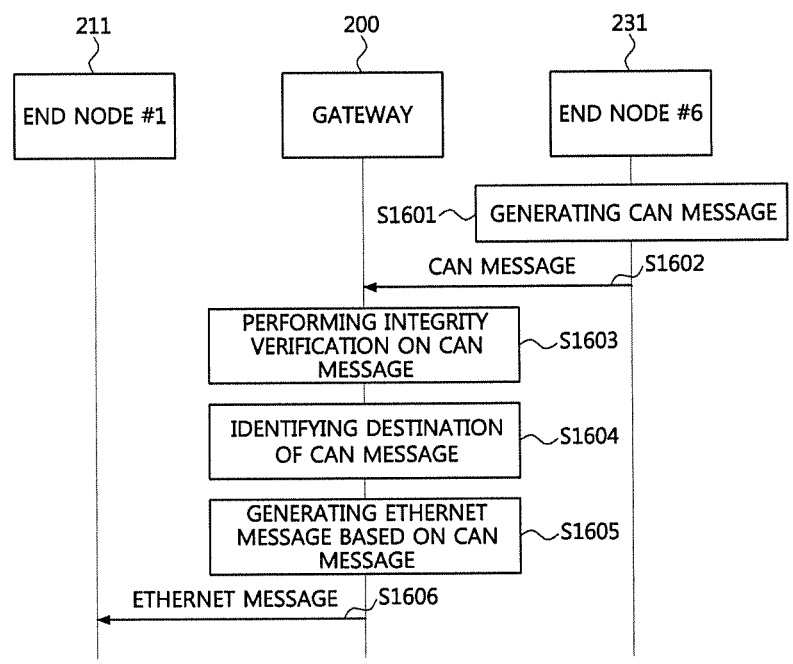

COMMUNICATION METHOD BASED ON AUTOMOTIVE SAFETY INTEGRITY LEVEL IN VEHICLE NETWORK AND APPARATUS FOR THE SAME

CROSS-REFERENCE TO RELATED APPLICATIONS

This application is based on and claims the benefit of priority to Korean Patent Applications No. 10-2016-0118340 filed on Sep. 13, 2016 and No. 10 2017-0095218 filed on Jul. 27, 2017 in the Korean Intellectual Property Office (KIPO), the entirety of which is incorporated by reference as if fully set forth herein.

TECHNICAL FIELD

The present disclosure relates to a communication technology in a vehicle network, and more specifically, to an automotive safety integrity level (ASIL) based communication technology in a vehicle network comprising a controller area network (CAN) and an Ethernet-based network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network does. However, applying the MOST-based network to vehicle networks can be costly. Due to these drawbacks, an Ethernet-based network is often utilized as a vehicle network. The Ethernet-based network may support bi-directional communication through one pair of windings and may support a transmission rate of up to 10 Gbps.

The vehicle network may support different communication protocols. For example, the vehicle network may include the CAN, an Ethernet-based network, and the like. In this case, it is necessary to have a protocol to support communications between the CAN and the Ethernet-based network. Also, techniques for improving communication reliability in the communications between the CAN and the Ethernet-based network are required.

SUMMARY

The present disclosure provides automotive safety integrity level (ASIL) based communication methods and apparatuses in a vehicle network comprising a CAN and an Ethernet-based network.

In accordance with embodiments of the present disclosure, an operation method of a first communication node supporting communications between an Ethernet-based network and a controller area network (CAN) may comprise receiving an Ethernet message from a second communication node belonging to the Ethernet-based network; performing an integrity verification on first automotive safety integrity level (ASIL) authentication information included in the Ethernet message; generating a CAN message based on the Ethernet message for which the integrity verification has been completed; and transmitting the CAN message to a third communication node belonging to the CAN.

The second communication node may be an end node, and the first ASIL authentication information may be generated by the end node.

The integrity verification may be performed when a destination of the Ethernet message is the CAN.

The integrity verification may be performed when the Ethernet message includes control information or management information.

The CAN message may include second ASIL authentication information, the second ASIL authentication information may be used for an integrity verification on the CAN message, and the second ASIL authentication information may be generated by the first communication node.

The CAN message may include at least one data unit indicated by a routing table among a plurality of data units included in the Ethernet message, and the routing table may indicate data units to be transmitted to the CAN.

The CAN message may include at least one data unit including information updated from data units stored in a memory of the first communication node among a plurality of data units included in the Ethernet message.

The CAN message may be transmitted according to a transmission period of the CAN.

Further, in accordance with embodiments of the present disclosure, an operating method of a first communication node supporting communications between an Ethernet-based network and a controller area network (CAN) may comprise receiving a CAN message from a second communication node belonging to the CAN; performing an integrity verification on first automotive safety integrity level (ASIL) authentication information included in the CAN message; generating an Ethernet message based on the CAN message for which the integrity verification has been completed; and transmitting the Ethernet message to a third communication node belonging to the Ethernet-based network.

The second communication node may be an end node, and the first ASIL authentication information may be generated by the end node.

The Ethernet message may include second ASIL authentication information, the second ASIL authentication information may be used for an integrity verification on the Ethernet message, and the second ASIL authentication information may be generated by the first communication node.

The Ethernet message may include at least one data unit indicated by a routing table among a plurality of data units included in the CAN message, and the routing table may indicate data units to be transmitted to the Ethernet-based network.

Further, in accordance with embodiments of the present disclosure, a first communication node supporting communications between an Ethernet-based network and a controller area network (CAN) may comprise a processor and a memory storing at least one instruction executed by the processor. Also, the at least one instruction may be configured to receive an Ethernet message from a second communication node belonging to the Ethernet-based network; perform an integrity verification on first automotive safety integrity level (ASIL) authentication information included in the Ethernet message; generate a CAN message based on the Ethernet message for which the integrity verification has been completed; and transmit the CAN message to a third communication node belonging to the CAN.

The second communication node may be an end node, and the first ASIL authentication information may be generated by the end node.

The integrity verification may be performed when a destination of the Ethernet message is the CAN.

The integrity verification may be performed when the Ethernet message includes control information or management information.

The CAN message may include second ASIL authentication information, the second ASIL authentication information may be used for an integrity verification on the CAN message, and the second ASIL authentication information may be generated by the first communication node.

The CAN message may include at least one data unit indicated by a routing table among a plurality of data units included in the Ethernet message, and the routing table may indicate data units to be transmitted to the CAN.

The CAN message may include at least one data unit including information updated from data units stored in the memory among a plurality of data units included in the Ethernet message.

The CAN message may be transmitted according to a transmission period of the CAN.

According to embodiments of the present disclosure, an end node (e.g., an electronic control unit (ECU)) belonging to a CAN or an Ethernet-based network can generate ASIL authentication information by using an authentication algorithm satisfying requirements according to the ASIL, generate a message (e.g., a CAN message or an Ethernet message) including a payload and the ASIL authentication information, and transmit the generated message.

A gateway that supports communications between the CAN and the Ethernet-based network can receive the message from the end node, and perform an integrity verification operation on the message based on the ASIL authentication information. When the integrity verification of the message is successfully completed, the gateway can generate a new message containing an integrity-verified data unit, and transmit the generated message to the CAN or Ethernet-based network. The message transmitted to the CAN or Ethernet based network may further include ASIL authentication information for the message. On the other hand, if the integrity verification of the message fails, the gateway can discard the message. Accordingly, the communication reliability can be improved in the communications between the CAN and the Ethernet-based network, and the performance of the vehicle network can be improved.

BRIEF DESCRIPTION OF THE DRAWINGS

Embodiments of the present disclosure will become more apparent by describing in detail forms of the present disclosure with reference to the accompanying drawings, in which:

FIG. 5 is a block diagram illustrating a first embodiment of a CAN message in a vehicle network;

FIG. 6 is a block diagram illustrating a second embodiment of a CAN message in a vehicle network;

FIG. 16 is a sequence chart illustrating a second embodiment of an operation method of a communication node in a vehicle network.

Figure 1:
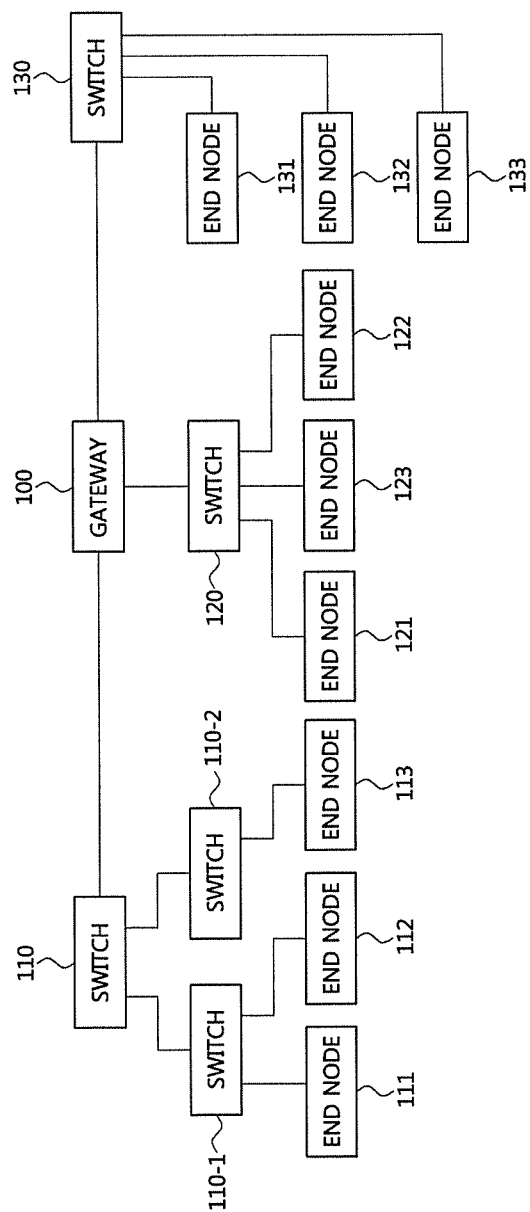
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Figure 2:
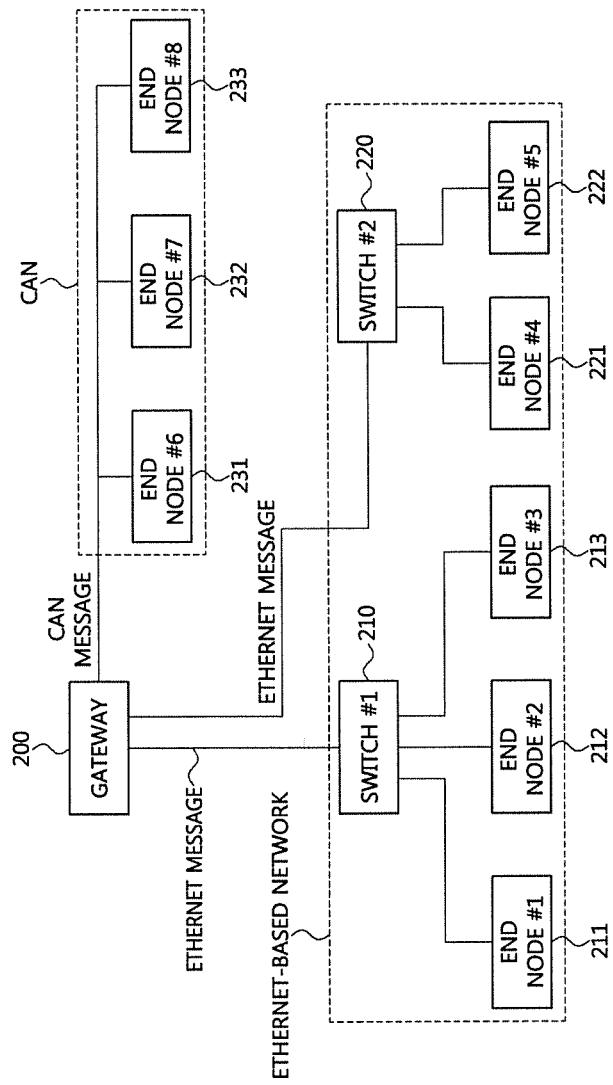
FIG. 2 is a block diagram illustrating a second embodiment of a vehicle network topology.

FIG. 2 is a block diagram illustrating a second embodiment of a vehicle network topology.

Referring to FIG. 2, a vehicle network may include an Ethernet-based network, a CAN, and the like. A gateway 200 belonging to the vehicle network may support communications between the Ethernet-based network and the CAN. The Ethernet-based network may include a switch #1 210, a switch #2 220, an end node #1 211, an end node #2 212, an end node #3 213, an end node #4 221, an end node #5 222, and the like. The end node #1 211, end node #2 212, and end node #3 213 may be connected to the switch #1 210, and the end node #4 221 and the end node #5 220 may be connected to the switch #2 220. Also, the switch #1 210 and the switch #2 220 may be connected to the gateway 200. A message based on the Ethernet protocol may be referred to as an 'Ethernet message', and the Ethernet message may also be referred to as an 'Ethernet frame', an 'Ethernet signal', an 'Ethernet packet', or the like. The communication nodes 210, 211, 212, 213, 220, 221, and 222 in the Ethernet-based network may perform communications by using the Ethernet messages, and communications between the gateway 200 and the Ethernet-based network may also be performed using the Ethernet messages.

The CAN may include an end node #6 231, an end node #7 232, an end node #8 233, and the like, and the end node #6 231, the end node #7 232, and the end node #8 233 may be connected to the gateway 200 through a bus line. A message based on the CAN protocol may be referred to as a 'CAN message', and the CAN message may also be referred to as a 'CAN frame', a 'CAN signal', a 'CAN packet', or the like. The communication nodes 231, 232, and 233 belonging to the CAN may communicate using the CAN messages, and communications between the CAN and the gateway 200 may also be performed using the CAN messages.

Embodiments according to the present disclosure may be applied to the vehicle network described above, but the vehicle network to which the embodiments according to the present disclosure are applied is not limited thereto and may be variously configured. In the vehicle network to which the embodiments according to the present disclosure are applied, each of the Ethernet message and the CAN message may be configured as follows.

Figure 3:
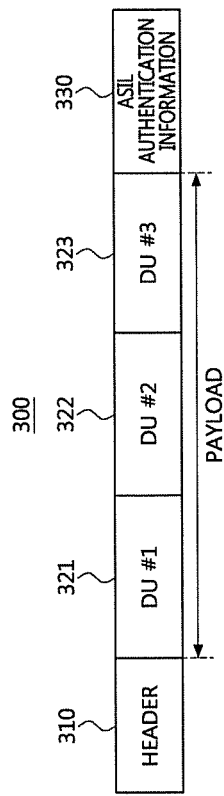
FIG. 3 is a block diagram illustrating a first embodiment of an Ethernet message in a vehicle network.

FIG. 3 is a block diagram illustrating a first embodiment of an Ethernet message in a vehicle network.

Referring to FIG. 3, an Ethernet message 300 may include a header 310, at least one data unit (DU) 321, 322, and 323, and the like. The DU #1 321, DU #2 322, and DU #3 323 may be protocol data units (PDUs), user datagram protocol (UDP) data units, or the like, and may constitute a payload. Also, the Ethernet message 300 may further include automotive safety integrity level (ASIL) authentication information 330. The ASIL authentication information 330 may be generated based on an authentication algorithm that satisfies requirements according to the ASIL, and may include an authentication key, a hash value, a cyclic redundancy check (CRC), a frame check sequence (FCS), and the like. The ASIL authentication information 330 may be configured by a communication node (e.g., an end node, a switch, a bridge, a gateway, etc.) that generates the Ethernet message 300. The header 310 of the Ethernet message 300 may be configured as follows.

Figure 4:
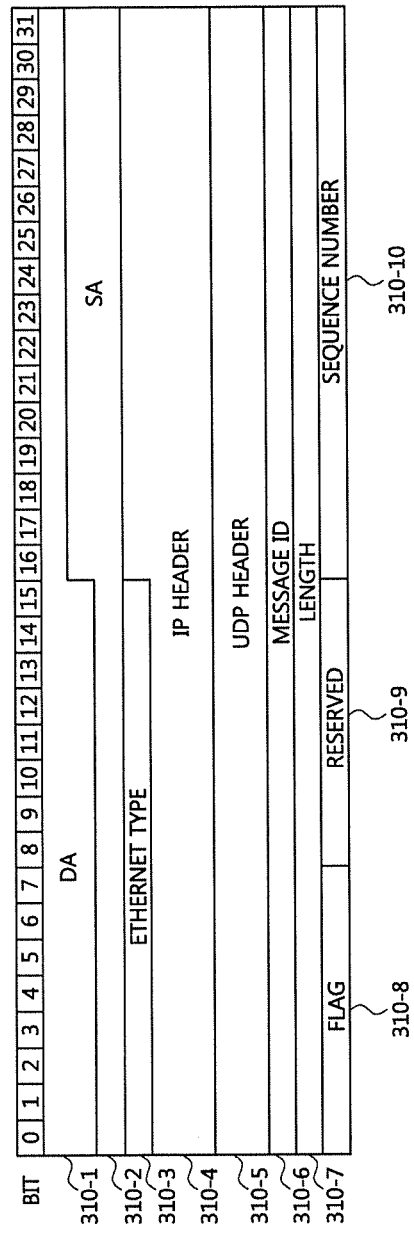
FIG. 4 is a block diagram illustrating a first embodiment of a header included in an Ethernet message.

FIG. 4 is a block diagram illustrating a first embodiment of a header included in an Ethernet message.

Referring to FIG. 4, the header 310 may include a destination address (DA) field 310-1, a source address (SA) field 310-2, an Ethernet type field 310-3, an internet protocol (IP) header 310-4, a UDP header 310-5, a message identifier (ID) field 310-6, a flag field 310-8, a reserved field 310-9, a sequence number field 310-10, and the like.

The DA field 310-1 may have a size of 6 bytes and may include identification information (e.g., a medium access control (MAC) address) of a communication node receiving the Ethernet message 300. The SA field 310-2 may have a size of 6 bytes and may include identification information (e.g., a MAC address) of a communication node transmitting the Ethernet message 300.

The Ethernet type field 310-3 may have a size of 2 bytes and may indicate the type of the Ethernet message 300. For example, in a case that a value indicated by the Ethernet type field 310-3 is greater than a hexadecimal number 0x600, the Ethernet type field 310-3 indicates a DIX format defined in the request for comments (RFC) 894. In a case that the value indicated by the Ethernet type field 310-3 is smaller than the hexadecimal number 0x600, the Ethernet type field 310-3 may indicate a subnetwork access protocol (SANP) format or a service access point (SAP) format defined by Institute of Electrical and Electronics Engineers (IEEE). Here, the Ethernet type field 310-3 may be configured to be a hexadecimal number 0x0800 indicating an internet protocol version 4 (IPv4).

The IP header 310-4 may have a length of 20 to 60 bytes and may include a protocol ID, checksum information, an SA IP address, a DA IP address, and the like. The UDP header 310-5 may have a length of 8 bytes, and may include a source port number, a destination port number, and checksum information. The message ID field 310-6 may have a length of 4 bytes and may be used to identify the Ethernet message 300 in the vehicle network. The length field 310-7 may have a length of 4 bytes and may indicate the length of the payload of the Ethernet message 300. The flag field 310-8 may have a size of 1 byte and may be set to a specific value indicating specific information (or performing a specific operation). The reserved field 310-9 may have a size of 1 byte. The sequence number field 310-10 may have a size of two bytes and may indicate a sequence number of the Ethernet message 300 (e.g., the payload included in the Ethernet message 300).

Also, the header 310 may include an indicator indicating the type of information included in the payload of the Ethernet message 300 (e.g., control information, management information, data (e.g., multimedia data, audio video bridging (AVB) data)). The indicator may be included in the Ethernet type field 310-3, the message ID field 310-6, the flag field 310-8, or the reserved field 310-9 of the header 310.

FIG. 5 is a block diagram illustrating a first embodiment of a CAN message in a vehicle network.

Referring to FIG. 5, a CAN message 500 may be generated based on a CAN flexible data (FD) format. The CAN message 500 may include a CRC 510 having a length of 2 bytes, an alive counter 520 having a length of 1 byte, a payload 530 having a length of 29 bytes, etc. The alive counter 520 may indicate an application level. The payload 530 may include at least one data unit. The ASIL authentication information for the CAN message 500 may be included in the payload 530.

FIG. 6 is a block diagram illustrating a second embodiment of a CAN message in a vehicle network.

Referring to FIG. 6, a CAN message 600 may be generated based on a high-speed CAN format or a low-speed CAN format. The CAN message 600 may include a CRC 610 having a length of 1 byte, a reserved field 620 having a length of 4 bits, an alive counter 630 having a length of 4 bits, a payload 640 having a length of 6 bytes, and the like. The alive counter 630 may indicate an application level. The payload 640 may include at least one data unit. The ASIL authentication information for the CAN message 600 may be included in the payload 640.

Further, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 7:
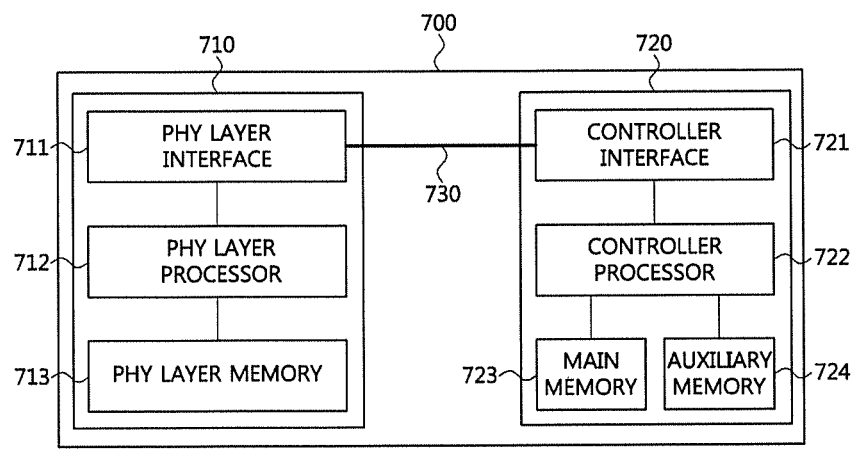
FIG. 7 is a block diagram illustrating a first embodiment of a communication node belonging to a vehicle network.

FIG. 7 is a block diagram illustrating a first embodiment of a communication node belonging to a vehicle network.

Referring to FIG. 7, a communication node 700 constituting a vehicle network (e.g., the vehicle network illustrated in FIG. 1 or 2) may include a physical (PHY) layer 710 and a controller 720. Also, the communication node 700 may further include a regulator (not shown) for supplying power. In particular, the controller 720 may be implemented to include a medium access control (MAC) layer. The PHY layer 710 may be configured to receive or transmit signals from or to another communication node. The controller 720 may be configured to control the PHY layer 710 and perform various functions (e.g., an infotainment function, or the like.). The PHY layer 710 and the controller 720 may be implemented as one system on chip (SoC), or alternatively may be implemented as separate chips.

The PI-1Y layer 710 and the controller 720 may be connected via a media independent interface (MII) 730. The MII 730 may include an interface defined in the IEEE 802.3 and may include a data interface and a management interface between the PHY layer 710 and the controller 720. One of a reduced MII (RMII), a gigabit MII (GMII), a reduced GMII (RGMII), a serial GMII (SGMII), a 10 GMII (XGMII) may be used instead of the MII 730. The data interface may include a transmission channel and a reception channel, each of which may have independent clock, data, and control signal. The management interface may include a two-signal interface, one signal for the clock and one signal for the data.

The PHY layer 710 may include a PHY layer interface 711, a PHY layer processor 712, and a PHY layer memory 713. The configuration of the PHY layer 710 is not limited thereto, and the PHY layer 710 may be configured in various ways. The PHY layer interface 711 may be configured to transmit a signal received from the controller 720 to the PHY layer processor 712 and transmit a signal received from the PHY layer processor 712 to the controller 720. The PHY layer processor 712 may be configured to control operations of the PHY layer interface 711 and the PHY layer memory 713. The PHY layer processor 712 may be configured to modulate a signal to be transmitted or demodulate a received signal. The PHY layer processor 712 may be configured to control the PHY layer memory 713 to input or output a signal. The PHY layer memory 713 may be configured to store the received signal and output the stored signal based on a request from the PHY layer processor 712.

The controller 720 may be configured to monitor and control the PHY layer 710 using the MII 730. The controller 720 may include a controller interface 721, a controller processor 722, a main memory 723, and an auxiliary memory 724. The configuration of the controller 720 is not limited thereto, and the controller 720 may be configured in various ways. The controller interface 721 may be configured to receive a signal from the PHY layer 710 (e.g., the PHY layer interface 211) or an upper layer (not shown), transmit the received signal to the controller processor 722, and transmit the signal received from the controller processor 722 to the PHY layer 710 or the upper layer. The controller processor 722 may further include independent memory control logic or integrated memory control logic for controlling the controller interface 721, the main memory 723, and the auxiliary memory 724. The memory control logic may be implemented to be included in the main memory 723 and the auxiliary memory 724 or may be implemented to be included in the controller processor 722.

Each of the main memory 723 and the auxiliary memory 724 may be configured to store a signal processed by the controller processor 722 and may be configured to output the stored signal based on a request from the controller processor 722. The main memory 723 may be a volatile memory (e.g., RAM) configured to temporarily store data required for the operation of the controller processor 722. The auxiliary memory 724 may be a non-volatile memory in which an operating system code (e.g., a kernel and a device driver) and an application program code for performing a function of the controller 720 may be stored. A flash memory having a high processing speed, a hard disc drive (HDD), or a compact disc-read only memory (CD-ROM) for large capacity data storage may be used as the non-volatile memory. Typically, the controller processor 722 may include a logic circuit having at least one processing core. A core of an Advanced RISC Machines (ARM) family or a core of an Atom family may be used as the controller processor 722.

Figure 8:
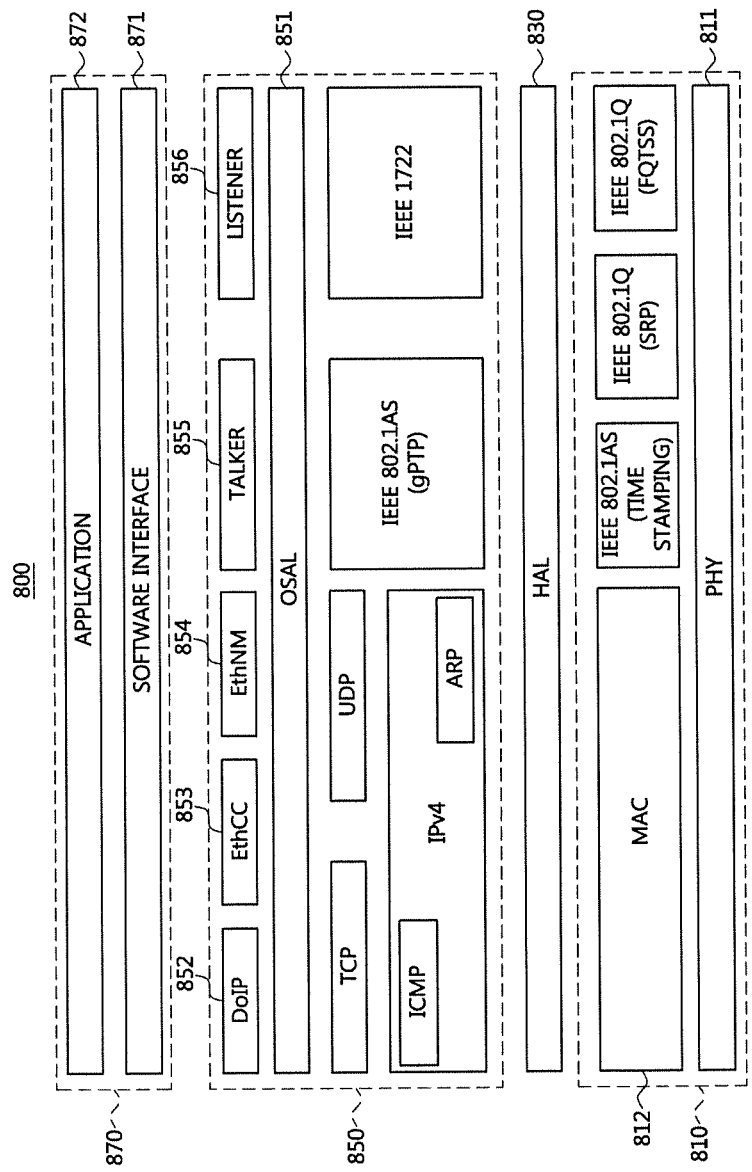
FIG. 8 is a block diagram illustrating a second embodiment of a communication node belonging to a vehicle network.

FIG. 8 is a block diagram illustrating a second embodiment of a communication node belonging to a vehicle network.

Referring to FIG. 8, a communication node 800 constituting a vehicle network (e.g., the vehicle network illustrated in FIG. 1 or 2) may include a hardware layer 810, a hardware abstraction layer (HAL) 830, a middleware layer 850, and an application layer 870. The hardware layer 810 may include a PHY layer 811 and a MAC layer 812. The PHY layer 811 may support the Ethernet protocol and may correspond to the PHY layer 710 described with reference to FIG. 7. The MAC layer 812 may support the Ethernet protocol (e.g., IEEE 802.3, etc.) and may correspond to the controller 720 described with reference to FIG. 7.

The hardware layer 810 may support the audio video bridging (AVB) protocol. For example, the hardware layer 810 may support IEEE 802.1AS time stamping protocol, IEEE 802.1Q stream reservation protocol (SRP), IEEE 802.1Q forwarding & queuing for time-sensitive stream (FQTSS) protocol, etc. The IEEE 802.1AS time stamping protocol may support a stamping operation on a transmission or reception time of a message according to IEEE802.1AS. The IEEE 802.1Q SRP protocol may support reservation operations of stream resources, reservation operations of traffic shaper, and the like. The IEEE 802.1Q FQTSS protocol may support shaping operation on messages to be transmitted, and the like. The hardware layer 810 may support the HAL 830 to enable the middleware layer 850 to operate.

The hardware layer 810 may support three modes. For example, the hardware layer 810 may support a normal mode, a sleep mode, and a power-off mode. In the normal mode, Ethernet communications can be performed. The PHY layer 811 may operate in a normal mode (e.g., an INH pin in an active state) and the MAC layer 812 may operate in an active mode (e.g., a state capable of transmitting and receiving messages). In the sleep mode, Ethernet communications can be performed with limited use of minimal power. When the hardware layer 810 is in the sleep mode, the PHY layer 811 may operate in a sleep mode (e.g., an INH pin in an inactive state) and may be woken up when a remote event is detected. Also, the MAC layer 812 may operate in an inactive mode (e.g., a state in which messages cannot be transmitted or received), and may be woken up when a local event is detected.

In a case that the state of the hardware layer 810 is in the power-off mode, the PHY layer 811 may operate in the sleep mode (e.g., an INH pin in an inactive state), and may be woken up when a remote event is detected. Also, the MAC layer 812 may operate in the inactive mode, and power may not be supplied to the MAC layer 812. That is, the MAC layer 812 cannot be woken up by a local event. The configuration of the hardware layer 810 is not limited to that described above, and the hardware layer 810 may be configured in various ways.

The middleware layer 850 may include an IP middleware layer operating based on a transfer control protocol/internet protocol (TCP/IP), an AVB middleware operating based on the AVB protocol, and an OSAL 851. The IP middleware layer may include a diagnostics over internet protocol (DoIP) unit 852, an EthCC unit 853, an EthNM unit 854, and the like. The DoIP unit 852 may be configured to perform diagnostic communications. The EthCC unit 853 may be configured to transmit and receive control messages. The EthNM unit 854 may be configured to perform network management. The IP middleware layer may support IPv4, internet control message protocol (ICMP), address resolution protocol (ARP), TCP, and UDP. The UDP may process the CRC, the alive counter, etc. for control messages or management messages.

The AVB middleware layer may include a talker unit 855, a listener unit 856, and the like. The talker unit 855 may be configured to perform transmission of an AVB stream based on the AVB protocol. The listener unit 856 may be configured to perform reception of the AVB stream based on the AVB protocol. The AVB middleware layer may support IEEE 802.1AS generalized precision time protocol (gPTP), IEEE 1722 AVB transport protocol (AVTP), etc. The IEEE 802.1AS gPTP may support an operation for selecting a grand master based on a best master clock algorithm (BMCA), an operation for clock synchronization, an operation for calculating a link delay, and the like. The IEEE 1722 AVTP may support operations such as generating an Ethernet message including an audio data unit and a video data unit.

The application layer 870 may include a software interface 871, an application 872, and the like. The software interface 871 may support input and output operations of signals for the application 872. The application 872 may include an application running on TCP/IP, an application running on the AVB protocol, and the like.

Figure 9:
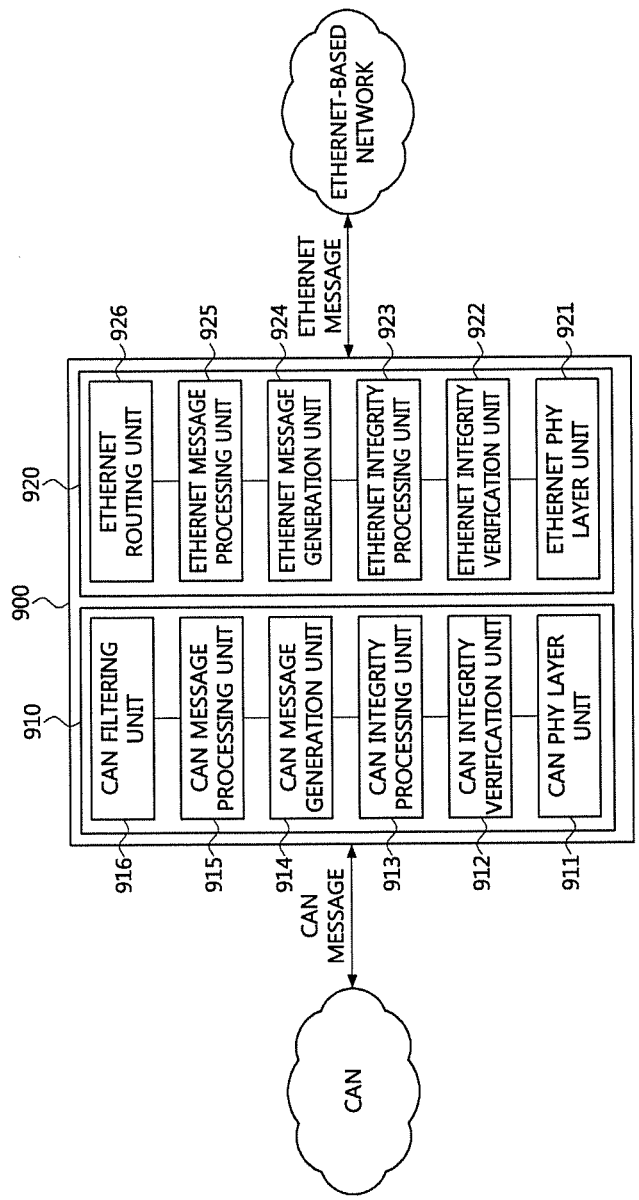
FIG. 9 is a block diagram illustrating a first embodiment of a gateway belonging to a vehicle network.

FIG. 9 is a block diagram illustrating a first embodiment of a gateway belonging to a vehicle network.

Referring to FIG. 9, a gateway 900 may be the gateway 100 belonging to the vehicle network of FIG. 1 or the gateway 200 belonging to the vehicle network of FIG. 2. The gateway 900 may support communications between the CAN and the Ethernet-based network. For example, the gateway 900 may convert a CAN message received from the CAN into an Ethernet message, and transmit the converted Ethernet message to the Ethernet-based network. Also, the gateway 900 may convert an Ethernet message received from the Ethernet-based network into a CAN message, and transmit the converted CAN message to the CAN.

The gateway 900 may include a CAN function block 910 that performs functions of the CAN protocol and an Ethernet function block 920 that performs functions of the Ethernet protocol. The CAN function block 910 may include a CAN PHY layer unit 911, a CAN integrity verification unit 912, a CAN integrity processing unit 913, a CAN message generation unit 914, a CAN message processing unit 915, a CAN filtering unit 916, and the like. The CAN PHY layer unit 911 may receive a CAN message by carrying out a monitoring operation on a bus line, and transmit a CAN message via the bus line. The CAN integrity verification unit 912 may perform an integrity verification operation on the ASIL authentication information included in the CAN message and discard the corresponding CAN message if the integrity verification fails. The CAN integrity processing unit 913 may perform an operation of generating ASIL authentication information to be included in the CAN message.

The CAN message generation unit 914 may perform a generation operation of a CAN message including a CRC, an alive counter, a payload (e.g., a data unit), ASIL authentication information, and the like. The CAN message processing unit 915 may perform a control operation for transmitting and receiving a CAN message. The CAN filtering unit 916 may verify that the data unit contained in the CAN message is the same as the data unit stored in a CAN buffer (e.g., memory). If the data unit contained in the CAN message is different from the data unit stored in the CAN buffer (e.g., if the data unit contained in the CAN message contains updated control information or updated management information), the CAN message may be transmitted. On the other hand, if the data unit contained in the CAN message is the same as the data unit stored in the CAN buffer (e.g., if the data unit contained in the CAN message contains existing control information or existing management information), the CAN filtering unit 916 may discard the data unit. Accordingly, the same data unit as the data unit stored in the CAN buffer may not be transmitted.

The Ethernet function block 920 may include an Ethernet PHY layer unit 921, an Ethernet integrity verification unit 922, an Ethernet integrity processing unit 923, an Ethernet message generation unit 924, an Ethernet message processing unit 925, an Ethernet routing unit 926, and the like. The Ethernet PHY layer unit 921 may receive an Ethernet message by performing a monitoring operation on an Ethernet link, and transmit an Ethernet message over the Ethernet link. The Ethernet PHY layer unit 921 may perform an Ethernet switch function (e.g., routing function, filtering function, etc.). The Ethernet integrity verification unit 922 may perform an integrity verification operation on the ASIL authentication information included in the Ethernet message and discard the Ethernet message if the integrity verification fails. The Ethernet integrity processing unit 923 may perform an operation of generating ASIL authentication information to be included in the Ethernet message.

The Ethernet message generation unit 924 may perform an operation of generating an Ethernet message including a header, a payload (e.g., a data unit), ASIL authentication information, and the like. The Ethernet message processing unit 925 may perform a control operation for transmitting and receiving an Ethernet message. The Ethernet routing unit 926 may control the transmission operation of the Ethernet message based on a preconfigured routing table.

Hereinafter, a method performed at a communication node belonging to a vehicle network and a corresponding counterpart communication node will be described. Hereinafter, even when a method (e.g., transmission or reception of a message) to be performed at a first communication node is described, a corresponding second communication node may perform a method corresponding to the method performed at the first communication node (e.g., receiving or transmitting the message). That is, when the operation of the first communication node is described, the corresponding second communication node may perform an operation corresponding to the operation of the first communication node. Conversely, when the operation of the second communication node is described, the corresponding first communication node may perform an operation corresponding to the operation of the switch.

Figure 10:
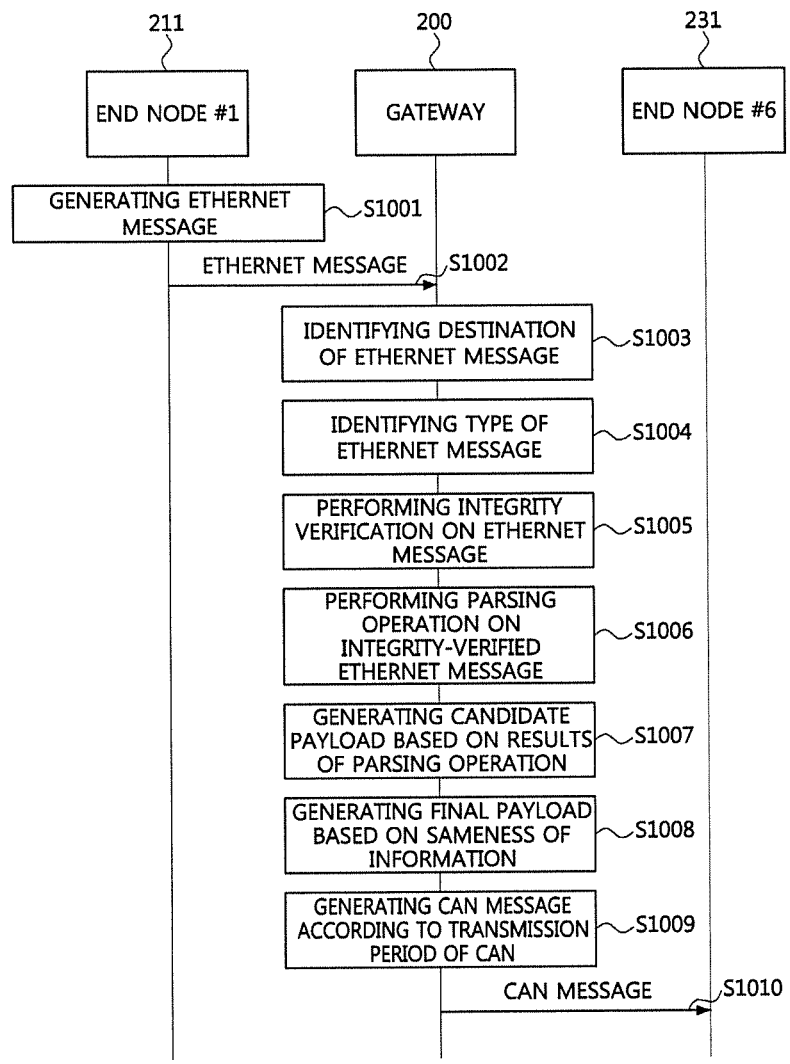
FIG. 10 is a sequence chart illustrating a first embodiment of an operation method of a communication node in a vehicle network.

FIG. 10 is a sequence chart illustrating a first embodiment of an operation method of a communication node in a vehicle network.

Referring to FIG. 10, the gateway 200, the end node #1 211, and the end node #6 231 may be the gateway 200, the end node #1 211, and the end node #6 231 belonging to the vehicle network of FIG. 2. For example, an operation method of a communication node illustrated in FIG. 10 may be performed in the vehicle network shown in FIG. 2, and each of the gateway 200, the end node #1 211, and the end node #6 231 may be configured identically to or similarly as the communication node 700 illustrated in FIG. 7 (or, the communication node 800 illustrated in FIG. 8). Also, the gateway 200 may be configured identically to or similar as the gateway 900 illustrated in FIG. 9.

The end node #1 211 may generate an Ethernet message (e.g., the Ethernet message 300 illustrated in FIGS. 3 and 4) (S1001). The Ethernet message generated by the end node #1 211 may be configured as follows.

Figure 11:
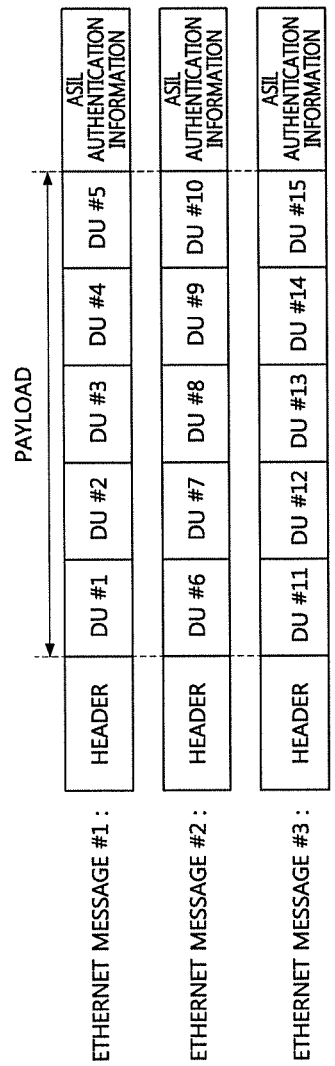
FIG. 11 is a block diagram illustrating a second embodiment of an Ethernet message in a vehicle network.

FIG. 11 is a block diagram illustrating a second embodiment of an Ethernet message in a vehicle network.

Referring to FIG. 11, the end node #1 211 may generate an Ethernet message #1, an Ethernet message #2, and an Ethernet message #3. Each of the Ethernet message #1, the Ethernet message #2, and the Ethernet message #3 may include a header, a payload, ASIL authentication information, and the like.

The header may include destination information of each of the Ethernet message #1, the Ethernet message #2, and the Ethernet message #3. The destination information may indicate at least one of communication nodes (e.g., the end node #2 212 and the end node #3 213) connected to the switch #1 210 belonging to the Ethernet-based network, communication nodes (e.g., the end node #4 221 and the end node #5 222) connected to the switch #2 220 belonging to the Ethernet-based network, and communication nodes (e.g., the end node #6 231, the end node #7 232, and the end node #8 233) belonging to the CAN.

The payload may include control information, management information, data (e.g., multimedia data, AVB data, etc.), and the like. The payload may also include five DUs (e.g., 'DU #1, DU #2, DU #3, DU #4 and DU #5', 'DU #6, DU #7, DU #8, DU #9, and DU #10', or 'DU #11, DU #12, DU #13, DU #14, and DU #15'). The ASIL authentication information may be generated based on an authentication algorithm that satisfies requirements according to the ASIL, and may include an authentication key, a hash value, a CRC value, an FCS, and the like. The ASIL authentication information may not be configured for each of the DUs included in the Ethernet message, but may be configured for the Ethernet message (i.e., the entire payload included in the Ethernet message).

If the payload of the Ethernet message includes data (e.g., multimedia data, AVB data, etc.), the ASIL authentication information for the Ethernet message may not be generated. Accordingly, the Ethernet message used for transmission of the data may not include ASIL control information. If the payload of the Ethernet message includes control information or management information, the ASIL authentication information for the Ethernet message may be generated. Accordingly, the Ethernet message used for transmission of the control information or management information may include ASIL control information.

Turning back to FIG. 10, the end node #1 211 may transmit Ethernet messages (e.g., the Ethernet message #1, the Ethernet message #2, and the Ethernet message #3 illustrated in FIG. 11) (S1002). The Ethernet messages may be transmitted according to a transmission period of the Ethernet-based network. For example, if the transmission period of the Ethernet-based network is 50 milliseconds, the end node #1 211 may transmit the Ethernet message #2 after 50 milliseconds from the transmission time of the Ethernet message #1, and transmit the Ethernet message #3 after 50 milliseconds from the transmission time of the Ethernet message #2.

In a case that the destination of the Ethernet message is the end node #2 212 or the end node #3 213 connected to the switch #1 210 belonging to the Ethernet-based network, the Ethernet message of the end node #1 211 may be transmitted to the end node #2 212 or the end node #3 213 via the switch #1 210. On the other hand, in a case that the destination of the Ethernet message is a communication node connected to the switch #2 220 in the Ethernet-based network or a communication node belonging to the CAN, the Ethernet message of the end node #1 211 may be transmitted to the gateway 200 via the switch #1 210.

The gateway 200 may receive the Ethernet messages of the end node #1 211 (e.g., the Ethernet message #1, the Ethernet message #2, and the Ethernet message #3 shown in FIG. 11), and identify the destination of the Ethernet messages based on the information included in the header of the Ethernet messages (S1003). In the case that the destination of the Ethernet message is a communication node connected to the switch #2 220 belonging to the Ethernet-based network, the gateway 200 may transmit the Ethernet message to the switch #2 220, and the switch #2 220 receiving the Ethernet message from the gateway 200 may transmit the Ethernet message to the end node #4 221 or the end node #5 222.

In the case that the destination of the Ethernet message is a communication node belonging to the CAN, the gateway 200 may identify the type of information included in the payload of the Ethernet message based on the information included in the header of the Ethernet message (S1004). When it is determined that the payload of the Ethernet message includes data (e.g., multimedia data, AVB data, etc.), the gateway 200 may generate a CAN message (e.g., the CAN message illustrated in FIG. 5 or 6), and transmit the generated CAN message to the corresponding communication node (e.g., the end node #6 231, the end node #7 232, or the end node #8 233). Here, the CAN message may include a CRC, an alive counter, a payload, etc., and the payload may include ASIL authentication information for the CAN message.

When the payload of the Ethernet message is identified as containing control information or management information, the gateway 200 may perform an integrity verification operation based on the ASIL authentication information included in the Ethernet message (e.g., the Ethernet message #1, the Ethernet message #2, and the Ethernet message #3 shown in FIG. 11) (S1005). For example, if the integrity verification of the ASIL authentication information of the Ethernet message #3 in FIG. 11 fails, the gateway 200 may discard the Ethernet message #3. If the integrity verification of the ASIL authentication information of the Ethernet message #1 and the Ethernet message #2 of FIG. 11 is successful, the gateway 200 may perform a parsing operation for the Ethernet message #1 and the Ethernet message #2 (S1006). That is, the gateway 200 may select at least one DU to be transmitted to the CAN by performing the parsing operation on the integrity-verified Ethernet message, and generate a candidate payload (e.g., a candidate payload to be included in the CAN message) including the selected at least one DU (S1007). The parsing operation and the generation operation of the candidate payload may be performed as follows.

Figure 12:
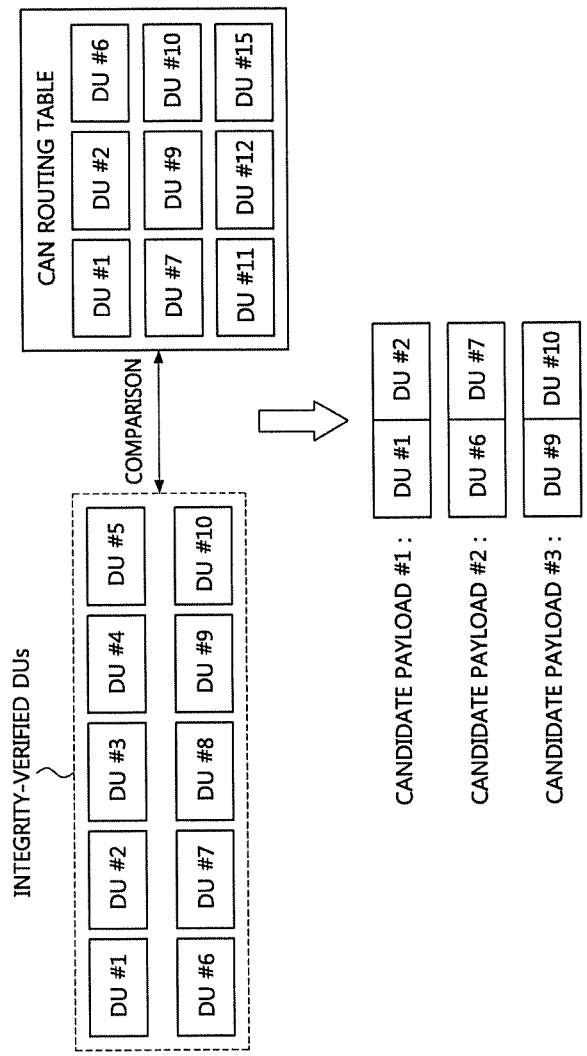
FIG. 12 is a conceptual diagram illustrating a first embodiment of a parsing operation and a candidate payload generation operation.

FIG. 12 is a conceptual diagram illustrating a first embodiment of a parsing operation and a candidate payload generation operation.

Referring to FIG. 12, the gateway 200 may compare a predefined CAN routing table with DU #1 through DU #10 for which the integrity verification has been completed. The CAN routing table may indicate DUs to be transmitted to the CAN. When the CAN routing table indicates DU #1, DU #2, DU #6, DU #7, DU #9 to DU #12, and DU #15, the gateway 200 may select the DU #1, DU #2, DU #6, DU #7, DU #9, and DU #10 from the DU #1 through DU #10 for which the integrity verification has been completed, and generated candidate payloads based on the selected DUs. Therefore, the gateway 200 may generate, for the CAN message, a candidate payload #1 including DU #1 and DU #2, a candidate payload #2 including DU #6 and DU #7, and a candidate payload #3 including DU #9 and DU #10.

Referring again to FIG. 10, since the information previously transmitted to the CAN is stored in the CAN buffer, the gateway 200 may generate a final payload by checking sameness between information contained in the DUs of the candidate payload and the information contained in the DUs stored in the CAN buffer (S1008). The CAN buffer may be a memory (e.g., the PHY layer memory 713, the main memory 723, and the auxiliary memory 724 shown in FIG. 7). The generation operation of the final payload of the CAN message may be performed as follows.

Figure 13:
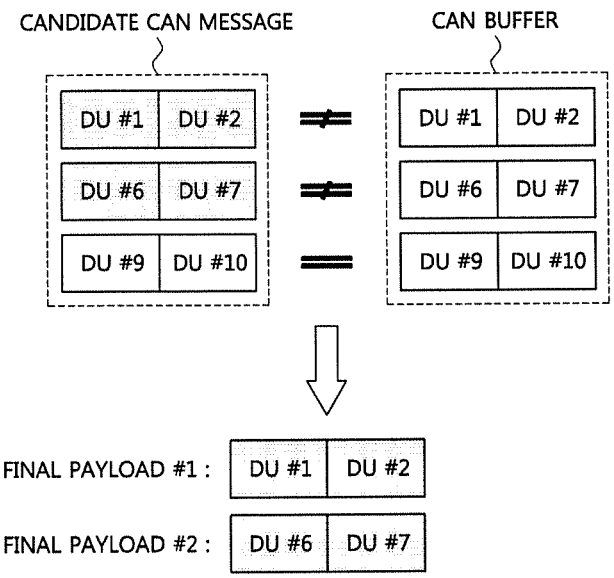
FIG. 13 is a conceptual diagram illustrating a first embodiment of a final payload generation operation.

FIG. 13 is a conceptual diagram illustrating a first embodiment of a final payload generation operation.

Referring to FIG. 13, the gateway 200 may compare DU #1, DU #2, DU #6, DU #7, DU #9, and DU #10 included in the candidate payloads with DU #1, DU #2, DU #6, DU #7, DU #9, and DU #10 which are stored in the CAN buffer. For example, the gateway 200 may compare the versions of the information (e.g., control information, management information) included in the DUs of the candidate payloads with those of the information (e.g., control information, management information) contained in the DUs stored in the CAN buffer.

In a case that the information included in DU #1, DU #2, DU #6, and DU #7 of the candidate payloads is different from the information contained in DU #1, DU #2, DU #6, and DU #7 of the CAN buffer (e.g., a case that the information contained in DU #1, DU #2, DU #6, and DU #7 of the candidate payloads is updated information as compared to the information contained in DU #1, DU #2, DU #6, and DU #7 of the CAN buffer), the gateway 200 may generate final payloads including the updated DU #1, DU #2, DU #6, and DU #7. Accordingly, the gateway 200 may generate a final payload #1 including the DU #1 and DU #2 and a final payload #2 including the DU #6 and DU #7 for the CAN message. On the other hand, if the information contained in DU #9 and DU #10 of the candidate payload is the same as the information contained in DU #9 and DU #10 of the CAN buffer, the gateway 200 may discard the DU #9 and DU #10.

Turning back to FIG. 10, the gateway 200 may generate the CAN message in consideration of the transmission period of the CAN (S1009). For example, when the transmission period of the Ethernet message is 50 milliseconds and the transmission period of the CAN message is 100 milliseconds, even if the gateway 200 receives two Ethernet messages during a transmission interval having a length of 100 ms, the gateway 200 may transmit a single CAN message corresponding to the Ethernet message according to the transmission period of the CAN message. For example, when the Ethernet message #1 and the Ethernet message #2 are received in a transmission interval having the length of 100 ms, the gateway 200 may generate a CAN message including the DUs belonging to the Ethernet message #2. The CAN message may be configured as follows.

Figure 14:
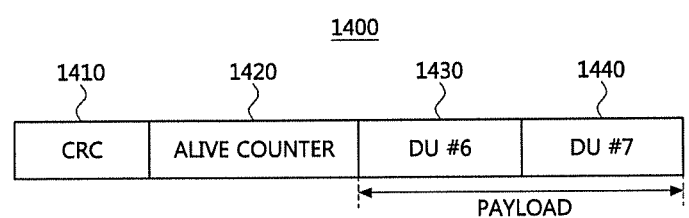
FIG. 14 is a block diagram illustrating a third embodiment of a CAN message in a vehicle network.
Figure 15:
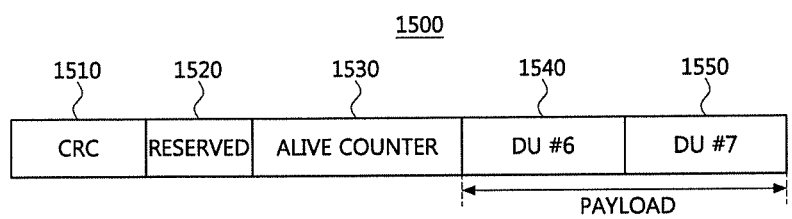
FIG. 15 is a block diagram illustrating a fourth embodiment of a CAN message in a vehicle network.

FIG. 14 is a block diagram illustrating a third embodiment of a CAN message in a vehicle network, and FIG. 15 is a block diagram illustrating a fourth embodiment of a CAN message in a vehicle network.

Referring to FIGS. 14 and 15, when the CAN FD format is used, a CAN message 1400 may include a CRC 1410, an alive counter 1420, the DU #6 1430, and the DU #7 1440. The gateway 200 may generate ASIL authentication information for the CAN message 1400, and the ASIL authentication information may be included in the DU #6 1430 or DU #7 1440. Alternatively, the ASIL authentication information may be included in the CAN message 1400 independently of the DU #6 1430 and the DU #7 1440.

When a low speed CAN format or a high speed CAN format is used, a CAN message 1500 may include a CRC 1510, a reserved field 1520, an alive counter 1530, the DU #6 1540, and the DU #7 1550. The gateway 200 may generate ASIL authentication information for the CAN message 1500, and the ASIL authentication information may be included in the DU #6 1540 or DU #7 1550. Alternatively, the ASIL authentication information may be included in the CAN message 1500 independently of the DU #6 1540 and the DU #7 1550.

Turning back to FIG. 10, since the size of the payload included in the Ethernet message is larger than the size of the payload included in the CAN message, a plurality of CAN messages may be generated based on one Ethernet message in step S1009. The gateway 200 may transmit the CAN message according to the transmission period of the CAN (S1010). The CAN message transmitted to the CAN may be stored in the CAN buffer of the gateway 200. That is, the DU including the updated control information or the updated management information may be overwritten in the CAN buffer. If the destination of the CAN message is the end node #6 231, the gateway 200 may transmit the CAN message to the end node #6 231.

Alternatively, the gateway 200 may generate the CAN message regardless of the CAN transmission period, and may transmit the generated CAN message. In this case, the gateway 200 may generate a CAN message #1 including the final payload #1 (e.g., the DU #1 and DU #2) of FIG. 3 and a CAN message #2 including the final payload #2 (e.g., the DU #6 and DU #7), and transmit the CAN message #1 and the CAN message #2 respectively.

On the other hand, the end node #6 231 may receive the CAN message by performing a monitoring operation on the bus line, and may perform an integrity verification operation on the ASIL authentication information included in the received CAN message. If the integrity verification of the ASIL authentication information of the CAN message is successful, the end node #6 231 may obtain the payload included in the CAN message and identify the control information or management information from the obtained payload. Alternatively, if the integrity verification of the ASIL authentication information of the CAN message fails, the end node #6 231 may discard the CAN message.

FIG. 16 is a sequence chart illustrating a second embodiment of an operation method of a communication node in a vehicle network.

Referring to FIG. 16, the gateway 200, the end node #1 211, and the end node #6 231 may be the gateway 200, the end node #1 211, and the end node #6 231 belonging to the vehicle network of FIG. 2. For example, an operation method of a communication node illustrated in FIG. 16 may be performed in the vehicle network shown in FIG. 2, and each of the gateway 200, the end node #1 211, and the end node #6 231 may be configured identically to or similarly as the communication node 700 illustrated in FIG. 7 (or, the communication node 800 illustrated in FIG. 8). Also, the gateway 200 may be configured identically to or similar as the gateway 900 illustrated in FIG. 9.

The end node #6 231 may generate a CAN message (e.g., the CAN message 500 shown in FIG. 5 or the CAN message 600 shown in FIG. 6) (S1601). The destination of the CAN message may be a communication node (e.g., the end node #7 232 or the end node #8 233) belonging to the CAN, or a communication node (e.g. the switch #1 210, the switch #2 220, the end node #1 211, the end node #2 212, the end node #3 213, the end node #4 221, or the end node #5 222) belonging to the Ethernet-based network. The payload of the CAN message may include control information, management information, and the like.

The end node #6 231 may transmit the CAN message to the gateway 200 (S1602). The gateway 200 may receive the CAN message from the end node #6 231 and perform an integrity verification operation on the ASIL authentication information included in the received CAN message (S1603). The gateway 200 may assume that the CAN message received from the CAN includes control information or management information. If the integrity verification operation for the ASIL authentication information of the CAN message fails, the gateway 200 may discard the corresponding CAN message. On the other hand, if the integrity verification operation for the ASIL authentication information of the CAN message is successful, the gateway 200 may identify the destination of the corresponding CAN message (S1604).

If the destination of the CAN message is a communication node belonging to the Ethernet-based network, the gateway 200 may generate an Ethernet message (e.g., the Ethernet message 300 shown in FIGS. 3 and 4) based on the corresponding CAN message (S1605). For example, the gateway 200 may generate ASIL authentication information for the Ethernet message and may generate the Ethernet message including a header, a payload (e.g., the payload included in the CAN message from the end node #6 231), and the ASIL authentication information. Also, the gateway 200 may generate the Ethernet message based on an Ethernet routing table. The Ethernet routing table may indicate DUs to be transmitted over the Ethernet-based network. For example, the Ethernet routing table may be configured to be the same as or similar to the CAN routing table shown in FIG. 12. Accordingly, the gateway 200 may generate the Ethernet message including at least one DU indicated by the Ethernet routing table among the DUs included in the payload of the CAN message.

If the destination of the CAN message received from the end node #6 231 is the end node #1 211, the gateway 200 may transmit the Ethernet message to the end node #1 211 (S1606). The Ethernet message may be transmitted to the end node #1 211 via the switch #1 210. The end node #1 211 may receive the Ethernet message by performing a monitoring operation on the Ethernet link, and perform an integrity verification operation on the ASIL authentication information included in the received Ethernet message. If the integrity verification of the ASIL authentication information of the Ethernet message is successful, the end node #1 211 may obtain the payload included in the Ethernet message and identify the control information or the management information from the obtained payload. Alternatively, if the integrity verification of the ASIL authentication information of the Ethernet message fails, the end node #1 211 may discard the Ethernet message.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node supporting communications between an Ethernet-based network and a controller area network (CAN), comprising:
receiving an Ethernet message from a second communication node belonging to the Ethernet-based network;
performing an integrity verification on first automotive safety integrity level (ASIL) authentication information included in the Ethernet message;
generating a CAN message based on the Ethernet message for which the integrity verification has been completed; and
transmitting the CAN message to a third communication node belonging to the CAN,
wherein the CAN message includes second ASIL authentication information, the second ASIL authentication information is used for an integrity verification on the CAN message, and the second ASIL authentication information is generated by the first communication node.

2. The operation method of claim 1, wherein the second communication node is an end node, and the first ASIL authentication information is generated by the end node.

3. The operation method of claim 1, wherein the integrity verification is performed when a destination of the Ethernet message is the CAN.

4. The operation method of claim 1, wherein the integrity verification is performed when the Ethernet message includes control information or management information.

5. The operation method of claim 1, wherein the CAN message includes at least one data unit indicated by a routing table among a plurality of data units included in the Ethernet message, and the routing table indicates data units to be transmitted to the CAN.

6. The operation method of claim 1, wherein the CAN message includes at least one data unit including information updated from data units stored in a memory of the first communication node among a plurality of data units included in the Ethernet message.

7. The operation method of claim 1, wherein the CAN message is transmitted according to a transmission period of the CAN.

8. An operating method of a first communication node supporting communications between an Ethernet-based network and a controller area network (CAN), comprising:
receiving a CAN message from a second communication node belonging to the CAN;
performing an integrity verification on first automotive safety integrity level (ASIL) authentication information included in the CAN message;
generating an Ethernet message based on the CAN message for which the integrity verification has been completed; and
transmitting the Ethernet message to a third communication node belonging to the Ethernet-based network,
wherein the Ethernet message includes second ASIL authentication information, the second ASIL authentication information is used for an integrity verification on the Ethernet message, and the second ASIL authentication information is generated by the first communication node.

9. The operating method of claim 8, wherein the second communication node is an end node, and the first ASIL authentication information is generated by the end node.

10. The operating method of claim 8, wherein the Ethernet message includes at least one data unit indicated by a routing table among a plurality of data units included in the CAN message, and the routing table indicates data units to be transmitted to the Ethernet-based network.

11. A first communication node supporting communications between an Ethernet-based network and a controller area network (CAN), comprising:
a processor; and
a memory storing at least one instruction executed by the processor,
wherein the at least one instruction is configured to:
receive an Ethernet message from a second communication node belonging to the Ethernet-based network;
perform an integrity verification on first automotive safety integrity level (ASIL) authentication information included in the Ethernet message;
generate a CAN message based on the Ethernet message for which the integrity verification has been completed; and
transmit the CAN message to a third communication node belonging to the CAN,
wherein the CAN message includes at least one data unit indicated by a routing table among a plurality of data units included in the Ethernet message, and the routing table indicates data units to be transmitted to the CAN.

12. The first communication node of claim 11, wherein the second communication node is an end node, and the first ASIL authentication information is generated by the end node.

13. The first communication node of claim 11, wherein the integrity verification is performed when a destination of the Ethernet message is the CAN.

14. The first communication node of claim 11, wherein the integrity verification is performed when the Ethernet message includes control information or management information.

15. The first communication node of claim 11, wherein the CAN message includes second ASIL authentication information, the second ASIL authentication information is used for an integrity verification on the CAN message, and the second ASIL authentication information is generated by the first communication node.

16. The first communication node of claim 11, wherein the CAN message includes at least one data unit including information updated from data units stored in the memory among a plurality of data units included in the Ethernet message.

17. The first communication node of claim 11, wherein the CAN message is transmitted according to a transmission period of the CAN.

* * * * *